US006594421B1

(12) United States Patent
Johnson et al.

(10) Patent No.: US 6,594,421 B1
(45) Date of Patent: Jul. 15, 2003

(54) DYNAMICALLY RECONFIGURABLE COMPOSITE GRATING FILTERS FOR TEMPORAL WAVEFORM PROCESSING

(75) Inventors: Alan E. Johnson, Eugene, OR (US); Eric S. Maniloff, Eugene, OR (US); Michael J. Munroe, Eugene, OR (US); Anders Grunnet-Jepsen, Eugene, OR (US); John N. Sweetser, Eugene, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/491,518

(22) Filed: Jan. 26, 2000

Related U.S. Application Data

(60) Provisional application No. 60/117,275, filed on Jan. 26, 1999.

(51) Int. Cl.[7] ............................ G02B 6/34; H04J 14/00
(52) U.S. Cl. ........................ 385/37; 385/1; 385/3; 385/24; 385/31; 359/115; 359/124; 359/130
(58) Field of Search ........................ 385/1, 2, 3, 31, 385/37, 24; 359/123, 135, 124, 127, 140, 138, 173, 115, 130

(56) References Cited

U.S. PATENT DOCUMENTS

| | | | | |
|---|---|---|---|---|
| 3,898,585 A | * | 8/1975 | Heidrich et al. | 372/96 |
| 5,172,258 A | * | 12/1992 | Verber | 359/138 |
| 5,337,382 A | | 8/1994 | Mizrahi | 385/37 |
| 5,351,147 A | | 9/1994 | Frenkel | 359/124 |
| 5,528,402 A | | 6/1996 | Parker | 359/87 |
| 5,668,901 A | | 9/1997 | Keck et al. | 385/37 |
| 5,726,785 A | | 3/1998 | Chawki et al. | 359/130 |
| 5,737,106 A | | 4/1998 | Sansonetti et al. | 359/140 |
| 5,748,350 A | | 5/1998 | Pan et al. | 359/134 |
| 5,764,829 A | | 6/1998 | Judkins et al. | 385/37 |
| 5,793,907 A | | 8/1998 | Jalali et al. | 385/24 |
| 5,796,502 A | | 8/1998 | Haller, Jr. | 359/124 |
| 5,812,318 A | * | 9/1998 | Babbitt et al. | 359/559 |
| 5,953,141 A | | 9/1999 | Liu et al. | 359/124 |
| 6,025,944 A | * | 2/2000 | Mendez et al. | 359/136 |
| 6,115,518 A | * | 9/2000 | Clapp | 385/37 |
| 6,292,282 B1 | * | 9/2001 | Mossberg et al. | 359/123 |
| 6,314,220 B1 | * | 11/2001 | Mossberg et al. | 385/37 |
| 6,369,937 B1 | * | 4/2002 | Verber et al. | 359/328 |

OTHER PUBLICATIONS

N. Vethanayagam and R.I. MacDonald, "Demonstration of a Novel Optical Code–Division Multiple–Access System at 800 Megachips per Second," *Optics Lett.* 16: 1010–1012 (Jul. 1991).

* cited by examiner

*Primary Examiner*—Brian Healy
(74) *Attorney, Agent, or Firm*—Blakely, Sokoloff, Taylor & Zafman LLP

(57) ABSTRACT

Programmable waveguide coders are disclosed that include one or more corrugation segments and one or more spacer segments formed on or in a waveguide defined by a core in an electro-optic substrate. Each of the corrugation segments and the spacer segments are independently controllable with voltages applied to each segment's electrodes. The spacer segments permit application of a phase modulation to an input while the corrugation segments act as tunable gratings, wherein a center grating wavelength is tunable by applying a voltage to an electrode associated with the corrugation segment. In some embodiments, coders include only corrugation segments or only spacer segments. Such coders can be strain tuned or thermally tuned. The coders can be programmatically tuned to code or decode a time-wavelength code or other code.

19 Claims, 19 Drawing Sheets

US 6,594,421 B1

DYNAMICALLY RECONFIGURABLE COMPOSITE GRATING FILTERS FOR TEMPORAL WAVEFORM PROCESSING

This application claims the benefit of Provisional Application No. 60/117,275 filed Jan. 26, 1999.

FIELD OF THE INVENTION

The invention pertains to methods and apparatus for optical processing of temporal waveforms.

BACKGROUND OF THE INVENTION

Optical processing of temporal waveforms can be performed using spectral filters such as the composite gratings described in, for example, U.S. Pat. No. 5,812,318, Apparatus and Methods for Routing of Optical Beams via Time-Domain Spatial-Spectral Filtering; U.S. patent application Ser. Nos. 09/100,592, abandoned and 09/115,331, pending, Segmented Complex Diffraction Gratings; U.S. patent application Ser. No. 09/120,959, now U.S. Pat. No. 6,314,220, Segmented Complex Fiber Gratings; and U.S. patent application Ser. No. 09/354,851, now U.S. Pat. No. 6,292,282, Time-Wavelength Multiple Access Optical Communication System and Method. These documents are incorporated herein by reference.

The spectral filters, coders, and decoders described in these references include optical fibers in which fiber Bragg gratings are formed. Unfortunately, the properties of these fiber Bragg gratings are fixed during manufacture so that systems using these devices are not readily reconfigurable. Dynamically reconfigurable devices that are programmable to provide different spectral filtering characteristics or codings are needed.

DETAILED DESCRIPTION

Figure 1:
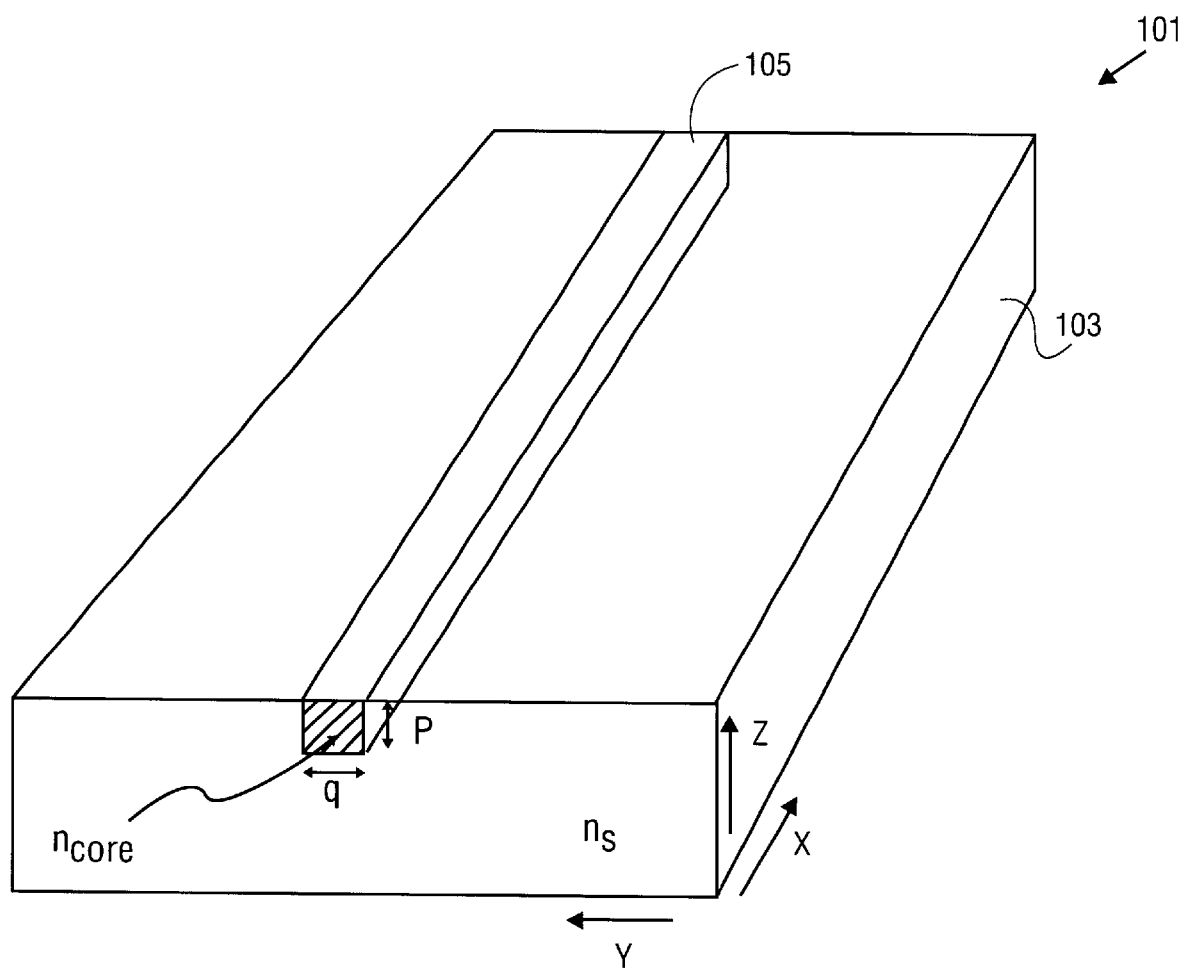
FIG. 1 is a perspective view of a waveguide formed in a lithium niobate substrate. The waveguide has a guided mode that propagates along an x-axis, with mode confinement along a y-axis and a z-axis.

As used herein, a "programmable" device is a device having properties that are electrically, thermally, mechanically, or otherwise tunable after manufacture of the device is complete. Programmable devices include waveguides, waveguide gratings, corrugation segments and spacer segments of waveguides, and coders using such waveguides and waveguide segments. "Coder" and "code generator" are used herein to refer to devices that either encode an input to produce an encoded output or that decode an input to produce a decoded output. Coders can encode and decode phase codes, amplitudes codes, or other codes. "Corrugation segments" are waveguide segments that include a variation in one or more optical properties. Such variations can be periodic with a single period or multiply periodic (a sum of several variations of different periods). More complex variations are also possible such as chirped variations in which the period of the variation changes continuously. Waveguide regions that contain no periodic variations but that are programmable to adjust a phase or other parameter of an optical pulse are referred to as "spacer segments." In some embodiments, spacer segments are provided to permit phase modulation. As used herein, "tunable" refers to a device that imparts a phase, amplitude, or other modulation to incident electromagnetic radiation, wherein the modulation can be programmatically adjusted after device manufacture.

Example embodiments are described that include "linear" electro-optic materials that exhibit the Pockels effect. As used herein, an "electro-optic" material is any material in which an applied voltage, electric field, or magnetic field produces a change in an optical property of the material.

Waveguides that include programmable composite gratings defined in a core or a cladding or other layer of a waveguide are provided. According to a specific embodiment, a programmable coder includes an optical waveguide having an electrically controllable index of refraction in one or more spatially distinct waveguide segments, each segment having a periodic refractive-index modulation.

Other example embodiments include one or more channel waveguides fabricated in an electro-optic material. The channel waveguides comprise alternating grating segments and phase-shift segments (spacer segments). The channel waveguides include one or more electrodes so that voltages applied to the grating segments are independently controllable to adjust a Bragg wavelength of each grating segment. The channel waveguides also include phase-shift segments that are independently controllable, so that optical delays or phase shifts between grating segments are independently controllable. An input pulse with bandwidth sufficient to span the operational bandwidth of such a channel waveguide (i.e., an input pulse having a bandwidth that spans the center frequencies of all grating segments of the channel waveguide) produces a diffracted output that comprises a set of spectrally and temporally selected subpulses with programmed phase shifts and frequencies. The bandwidth and center frequency of a particular subpulse depend upon the grating segment that produced that subpulse. Output timing (and hence phase) of the subpulse is determined by a spatial position of the grating that produced the subpulse and of the index of refraction of the grating segments and phase-shifting segments through which that subpulse is transmitted before exiting the channel waveguide.

Additional examples, methods, and features are described below with reference to the accompanying drawings.

With reference to FIG. 1, a waveguide 101 comprises a waveguide core 105 in a lithium niobate substrate 103 or other electro-optic material or other tunable optical material. The core 105 of the waveguide 101 provides mode confinement along a y-axis and a z-axis so that radiation propagates along the x-axis in the waveguide 101. The core 105 has a width q (measured along the y-axis) and a depth p (measured along the z-axis). The substrate 103 has a refractive index $n_{so}$ for light polarized in an ordinary direction and $n_{se}$ for light polarized in an extraordinary direction. For the lithium niobate waveguide of FIG. 1, the ordinary polarization direction is parallel to the y-axis and the extraordinary polarization direction is parallel to the z-axis. The core 105 has refractive indices $n_{core-o}$ for ordinary polarization and $n_{core-e}$ for extraordinary polarization. The orientation of the waveguide 101 with respect to the crystalline axes of lithium niobate is selected to take advantage of lithium niobate's large electro-optic coefficient $r_{33}$, but other orientations are possible. Typically, an orientation of an electro-optic substrate is selected to take advantage of any large electro-optic coefficients, but can be selected for other reasons as well, such as to obtain an electrical impedance match or to reduce acousto-optic effects.

The values of the refractive indices $n_{so}$ and $n_{se}$ are determined by the substrate (lithium niobate). The values of the refractive indices $n_{core-o}$ and $n_{core-e}$ are determined by the substrate and the processing method used to define the core 105. For example, in lithium niobate, the core 105 can be fabricated by either titanium in-diffusion or proton in-diffusion to produce a refractive-index change in the core 105. The core dimensions p, q are selected in conjunction with the various refractive indices in order to provide desired waveguide properties. Typically, the dimensions and refractive indices are selected to provide a single-mode waveguide in which only a single waveguide mode is guided and other modes (higher-order modes) are attenuated. In addition, the dimensions p, q can be selected for ease in coupling radiation into and out of the channel waveguide 101. For example, alignment tolerances for coupling radiation into a waveguide having large values of the dimensions p, q are relatively large.

Figure 2A:
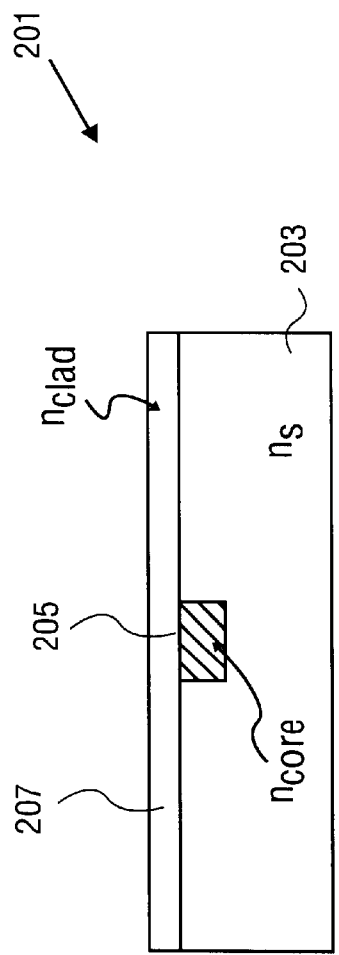
FIGS. 2A–2B are sectional views of a waveguide formed in a lithium niobate substrate and having a cladding layer.
Figure 2B:
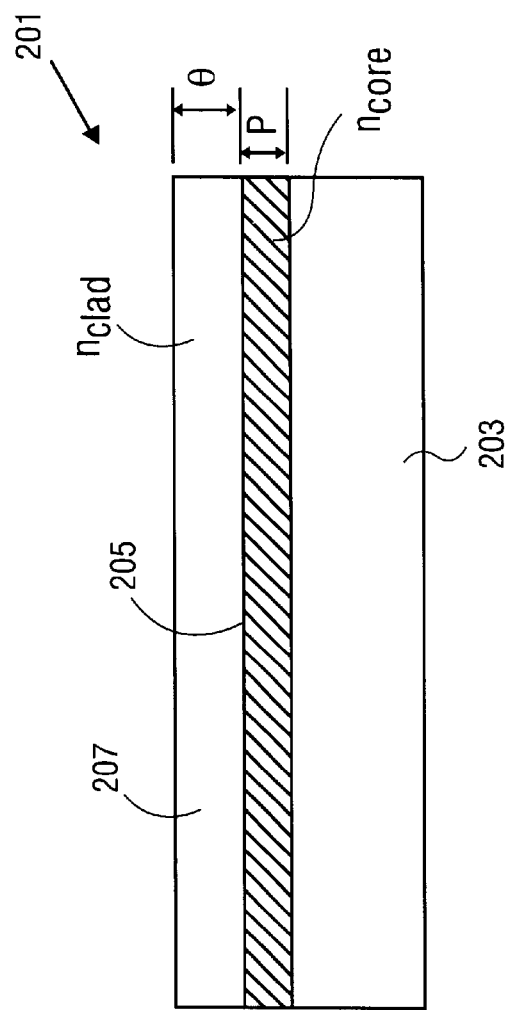

With reference to FIGS. 2A–2B, a waveguide 201 formed in a lithium niobate substrate 203 includes a cladding layer 207 of thickness θ and refractive index $n_{clad}$. The thickness θ of the cladding layer 207 can be modulated to produce an effective refractive index of modulation (i.e., an index grating) in the waveguide 201.

Figure 3:
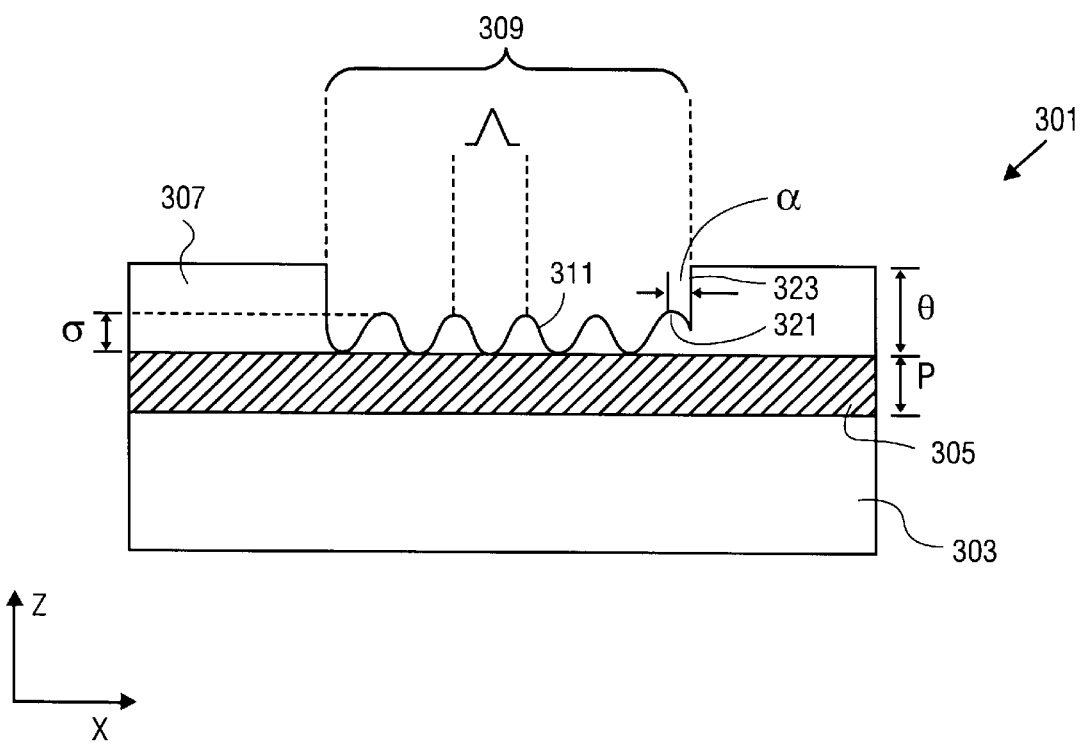
FIG. 3 is a sectional view of a waveguide formed in a lithium niobate substrate that includes a corrugated cladding layer. The corrugation is obtained by pressing a corrugated mold into the cladding layer.

With reference to FIG. 3, a waveguide 301 comprises a lithium niobate substrate 303, a core 305, and a cladding layer 307 in which a corrugation segment 309 is defined. The corrugation segment 309 has a corrugation 311 characterized by a period Λ, a modulation depth σ, and a phase α. The phase α represents a relative phase of the corrugation 311 and is shown as a displacement of a corrugation maximum 321 from a corrugation segment boundary 323. The phase α is conveniently measured in degrees or fractions of a wavelength.

The corrugation segment 309 can be produced by several methods. For example, a corrugated stamp or die can be pressed against the cladding layer 307 to surficially impress the corrugation segment into the surface of the cladding layer. A single corrugated stamp can be used to produce corrugation segments on several waveguides or the corrugated stamp can remain in contact with the cladding layer 307 and become part of the waveguide 301.

Figure 4:
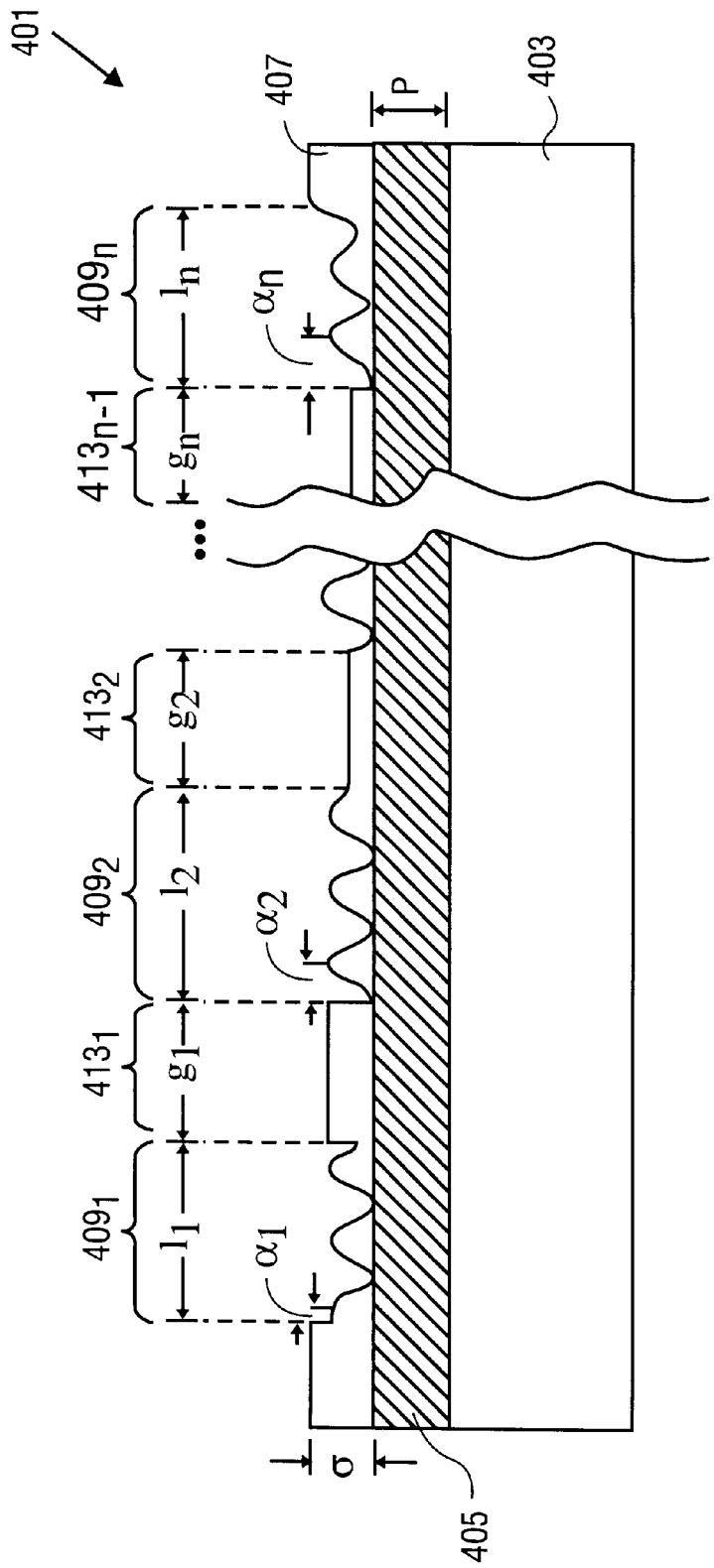
FIG. 4 is a sectional view of a channel waveguide formed in a lithium niobate substrate and having a cladding layer that includes n distinct corrugation segments, each having a respective length $l_i$ and separated by spacer segments, each having a respective length $g_i$.

With reference to FIG. 4, a waveguide 401 includes a core 405 of refractive index $n_{core}$ formed in a substrate 403 and a cladding layer 407 of refractive index $n_{clad}$. Corrugation segments $409_i$ of lengths $l_i$, for i=1, . . . , n, separated by spacer segments $413_i$ of lengths $g_i$ for i=1, . . . , n−1 are defined in the cladding layer 407. Each of the corrugation segments $409_i$ has a central diffraction wavelength $\lambda_i$ that depends on a corresponding corrugation period $\Lambda_i$ according to a Bragg condition:

$$\Lambda_i = \lambda_i / 2n_{effective},$$

wherein $n_{effective}$ is an effective index of refraction for propagation of electromagnetic radiation in a guided mode in the waveguide 401. The effective index $n_{effective}$ generally depends on the refractive indices $n_{core}$, $n_{clad}$ as well the waveguide dimensions, shape, and order of the propagating mode. In addition to the corrugation period $\Lambda_i$, each corrugation segment $409_i$ has a corresponding phase $\alpha_i$ and a modulation depth $\sigma_i$. The lengths $l_i$, $g_i$ of the corrugation segments $409_i$ and spacer segments $413_i$, respectively, are selected to achieve desired spectral filtering functions. The spectral filtering functions also depend on the cladding refractive index $n_{clad}$, the modulation depths $\sigma_i$, and the core refractive index $n_{core}$.

For the lithium niobate waveguides of FIGS. 1, 2A–2B, and 3–4, waveguide properties can be electrically controlled using the electro-optic effect. Tuning of both the corrugation and spacer segments can be achieved by applying respective voltages to these segments. Alternatively, the waveguides can be controlled by controlling the respective temperatures of the corrugation and spacer segments. The spacer segments provide programmable phase tuning, while the corrugation segments provide programmable center wavelengths as well as phase tuning. Tuning of a corrugation segment typically tunes both the center wavelength and the phase of the corrugation segment.

Figure 5:
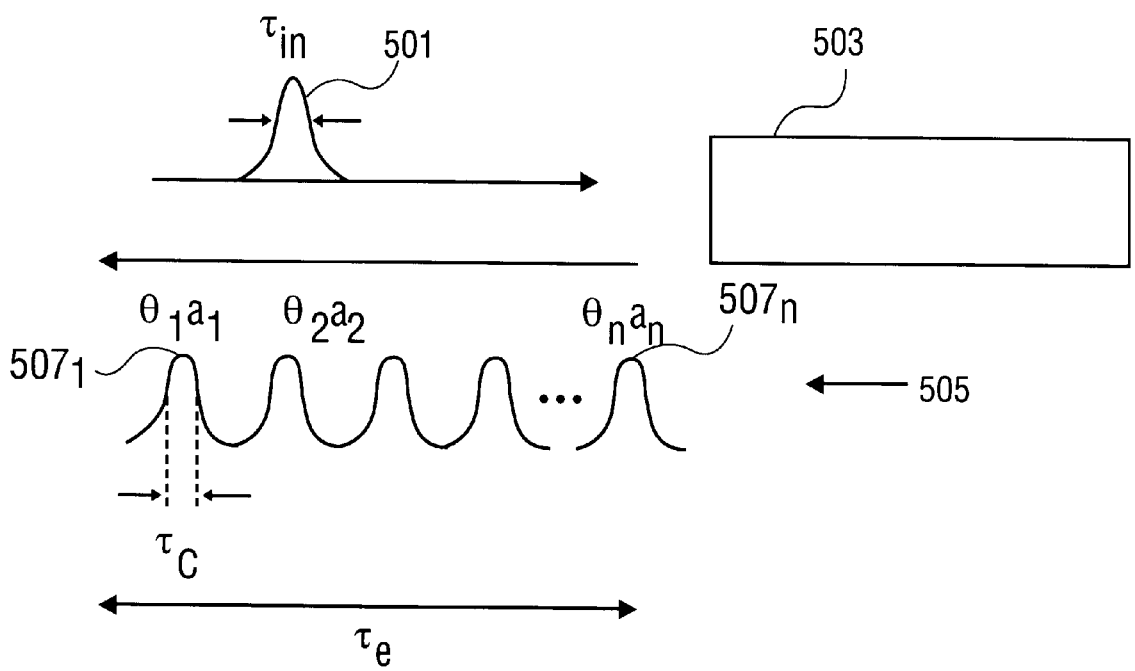
FIG. 5 illustrates the operation of a coder that produces a coded output by spectrally filtering an input pulse of length $\tau_{in}$ to generate a series of output pulses, each having a duration $\tau_c$ and a corresponding amplitude $a_i$ and phase $\phi_i$. The phase $\phi_i$ is selected by selecting appropriate voltages to the coder and $\tau_e$ is a total duration of the coded output.

FIG. 5 illustrates operation of a coder 503. An input pulse 501 of duration $\tau_{in}$ is incident to the coder 503. The coder 503 spectrally filters the input pulse 501 and produces a corresponding coded output 505 having a duration $\tau_e$. Such a coded output can be used as a temporal identification code in an optical code division multiple access ("CDMA") system or for other applications. The coded output 505 comprises a series of output pulses $507_i$ each having a respective pulse duration $\tau_c$, respective amplitude $a_i$, and respective phase $\phi_i$, wherein i=1, . . . , n. While the output pulses $507_i$ of FIG. 5 are temporally separated from each other, the duration $\tau_c$ also can be selected so that the output pulses $507_i$ completely or partially overlap each other. In addition, the pulse duration $\tau_c$ need not be the same for each of the pulses $507_i$. Typically, each of the pulses $507_i$ includes programmably selected spectral components of the input pulse 501.

Figure 6:
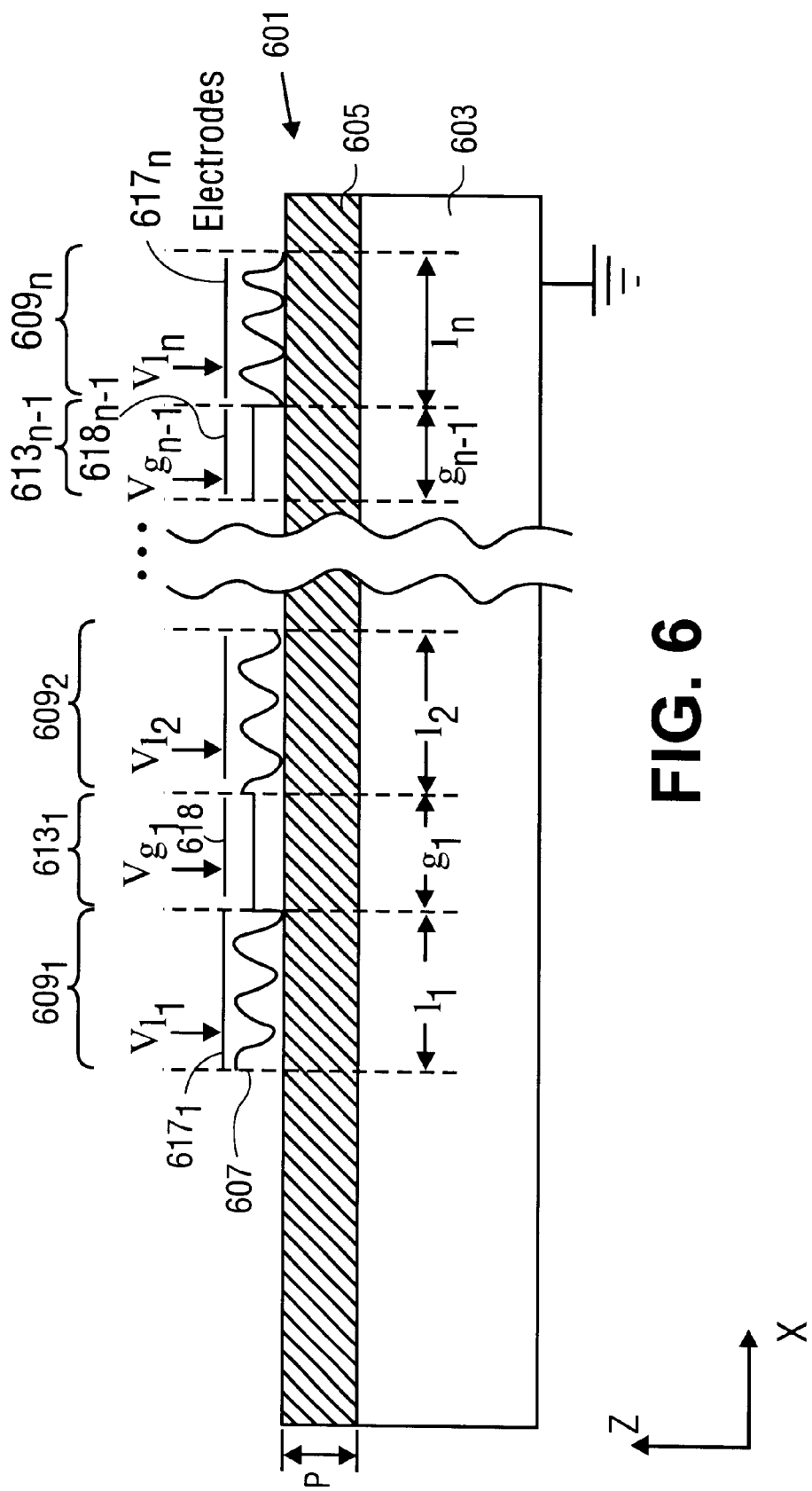
FIG. 6 is a schematic view of an exemplary coder in which voltages can be applied independently to one or more corrugation segments or spacer segments. A voltage $V_{l_i}$ applied to a selected corrugation segment tunes a center frequency of the selected corrugation segment using a refractive-index variation produced by the electro-optic effect. A voltage $V_{g_i}$ applied to a selected spacer segment produces a programmable phase shift proportional to $V_{g_i}$.

With reference to FIG. 6, a waveguide coder 601 comprises a core 605, a substrate 603, and a cladding layer 607. Corrugation segments $609_i$ and spacer segments $613_i$ are defined in the cladding layer 607 and are controlled by respective independent voltages $V_{l_i}$, $V_{g_i}$ applied to respective electrodes $617_i$, $618_i$. The voltage $V_{l_i}$ applied to an ith corrugation segment $609_i$ controls a respective grating period $\Lambda_i$ via the linear electro-optic effect, thereby changing a respective center diffraction wavelength $\lambda_i$ of the corrugation segment $609_i$. The voltage $V_{g_i}$ applied to an ith spacer segment $613_i$ produces a respective variable phase shift proportional to $V_{g_i}$. The electrodes $617_i$, $618_i$ are shown positioned above the cladding layer 607, but are generally conductive layers deposited directly on the cladding layer 607.

As an example, a coder configured to produce an output of 8 pulses, each having a 30-ps duration ($\tau_c$=30 ps) in a lithium niobate substrate ($n_e$=2.2) has 8 identical corrugation segments $609_i$ of length $l=c\tau_c/2n_{core}$=2mm, wherein c is the speed of light. For operation at a wavelength of 1550 nm, the corrugation period is $\Lambda=\lambda/2n_{core}$, or 352 nm. (The subscript i can be dropped because the corrugation segments are identical.)

The voltages $V_{l_i}$, $V_{g_i}$ are determined based on a change in refractive index $\Delta n_{eo}$ produced in an electro-optic material by application of a voltage V to electrodes having a spacing d:

$$\Delta n_{eo} = -\frac{n^3 l}{2}\frac{V}{d}\Gamma$$

wherein n is a refractive index with no applied voltage and $\Gamma$ is an efficiency factor pertaining to the efficiency with which the applied voltage produces a refractive-index change, measured relative to the refractive-index change that otherwise would be produced by using large, parallel plate electrodes. In a corrugation segment, the refractive-index change $\Delta n_{eo}$ changes the respective center wavelength as well as the respective phase. In spacer segments, the refractive-index change $\Delta n_{eo}$ produces a respective phase modulation.

While high voltages are generally required to produce substantial phase changes in bulk electro-optic devices, lithium niobate waveguides of length 1 cm have been built that have halfwave voltages of about 8 volts. (A "halfwave voltage" is a voltage required to produce a 180-degree phase shift.) A 2-mm long waveguide segment used in a double-pass geometry has a halfwave voltage of about 20 volts. Lengths of spacer segments can be chosen for small temporal gaps in a coded sequence or to reduce the magnitude of the modulation voltages needed to permit high-speed modulation. Longer segments permit lower modulation voltages.

Figure 7:
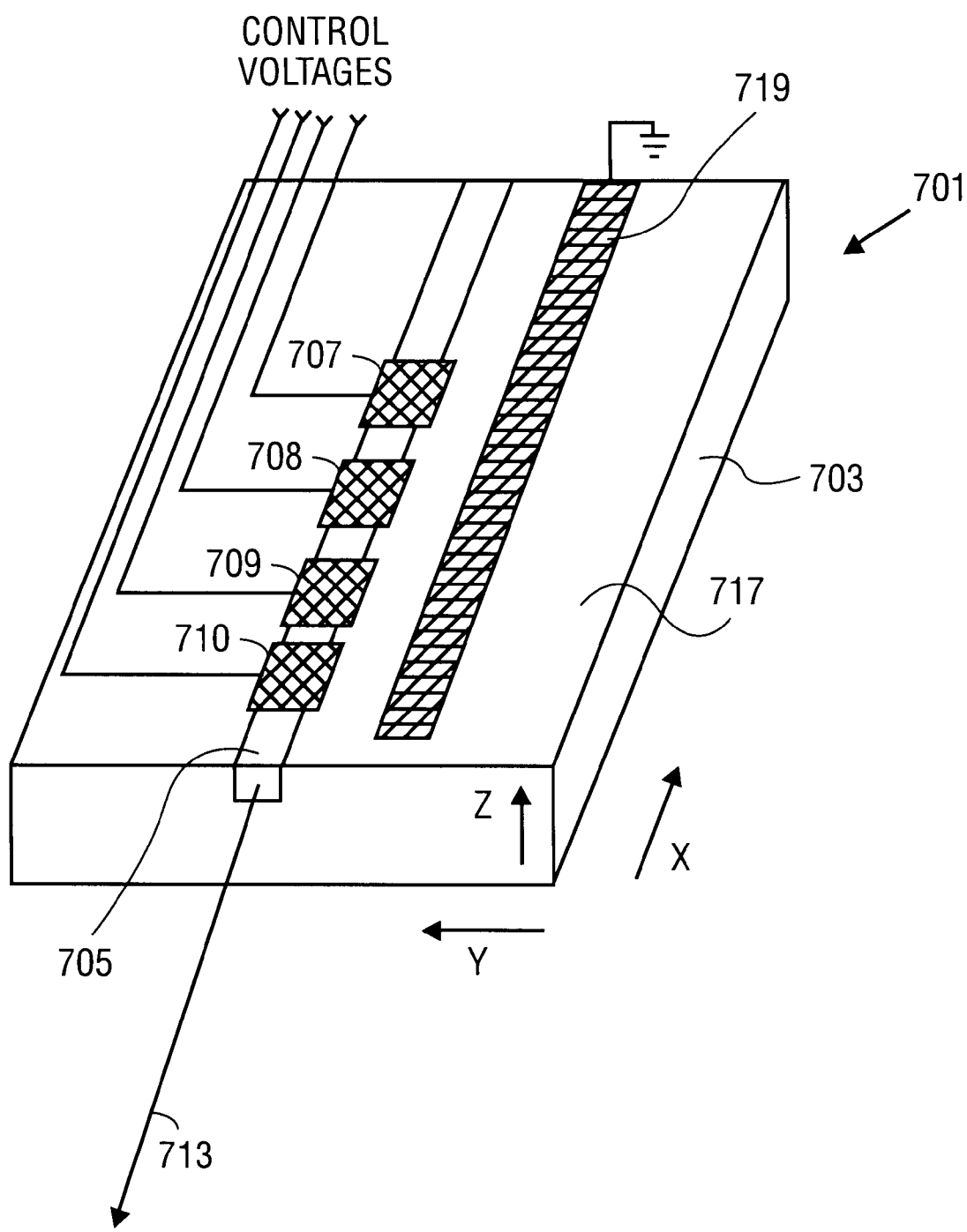
FIG. 7 is a perspective view of a coder similar to that of FIG. 6 and having a ground plane and control electrodes situated on a surface of a substrate in which a waveguide core is defined. Electrodes corresponding to individual corrugation segments are situated on the waveguide core and a common electrode or ground plane is displaced from the waveguide core.

With reference to FIG. 7, a waveguide 701 comprises a substrate 703 and a core 705. Control electrodes 707–710 are situated on a surface 717 of the substrate 703 on a waveguide axis 713. A common electrode 719 (for example, a ground plane) is also situated on the surface 717 but offset from the axis 713. Selecting appropriate voltages to be applied to the control electrodes 707–710 permits programmable selection of a respective center wavelength or a respective phase for each of the corresponding corrugation segments or spacer segments, respectively. (For clarity in showing the electrodes 707–710, FIG. 7 does not show any corrugation segments or spacer segments.)

Figure 8:
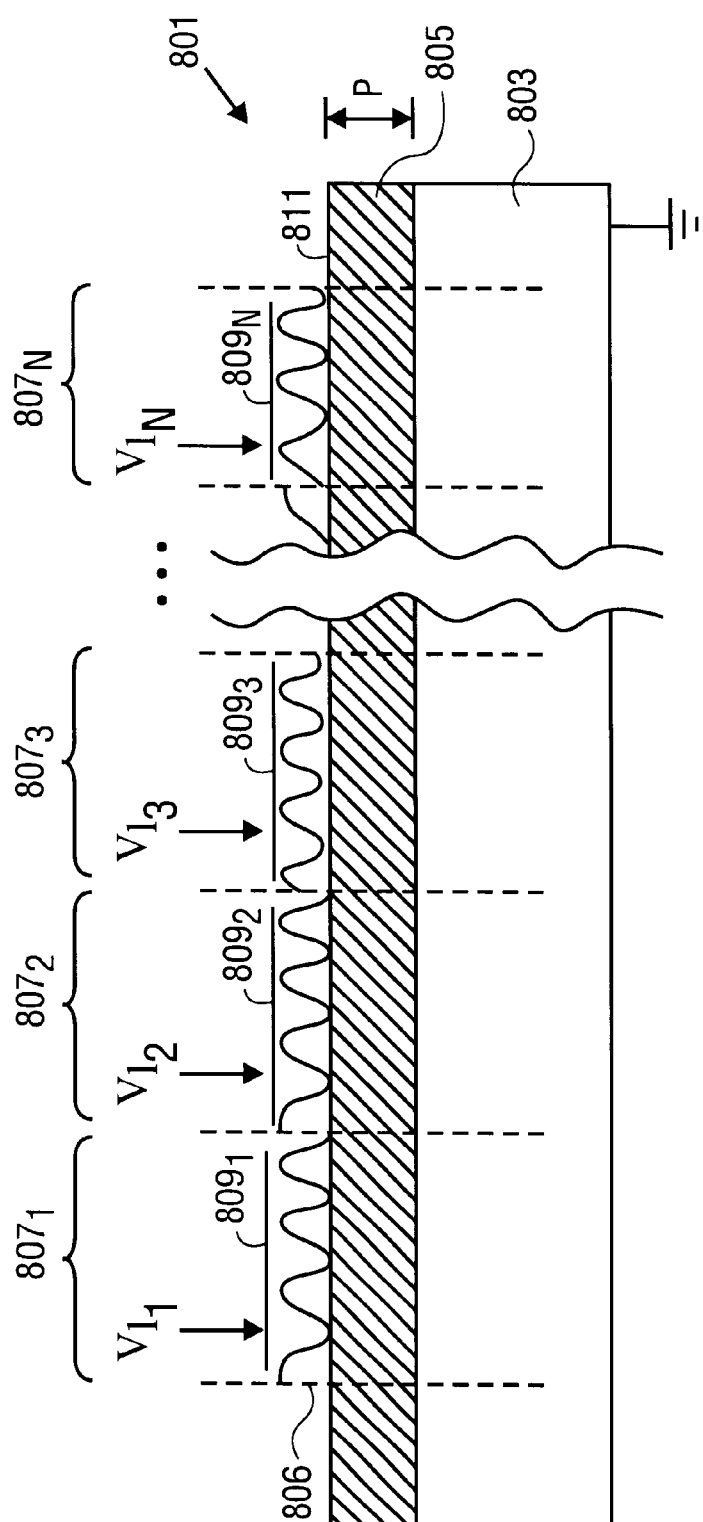
FIG. 8 is a sectional view of another exemplary coder that produces phase shifts by electro-optic tuning of corrugation segments with applied voltages sufficient to produce selected phase shifts but small enough so that central wavelengths of the corrugation segments remain within a design bandwidth.

With reference to FIG. 8, a waveguide coder 801 comprises a substrate 803, a core 805, and a cladding layer 806. Corrugation segments $807_i$ ($807_1$, . . . , $807_N$) are provided at a surface 811 of the core 805 and have corresponding electrodes $809_i$ ($809_1$, . . . , $809_N$). For clarity, the electrodes $809_1$, . . . , $809_N$ are shown in FIG. 8 positioned above respective corrugation segments $807_1$, . . . , $807_N$ but are generally deposited directly on the cladding layer 806. The segment phases, amplitudes, and periods for each corrugation segment $807_i$ are not shown in FIG. 8. Phase shifting of the output pulses in the coded output produced by the coder 801 is achieved by electro-optic tuning of the corrugation segments $807_i$ by an amount sufficient to generate a desired phase shift but not so large as to tune a central wavelength of any segment outside of a design bandwidth.

Figure 9:
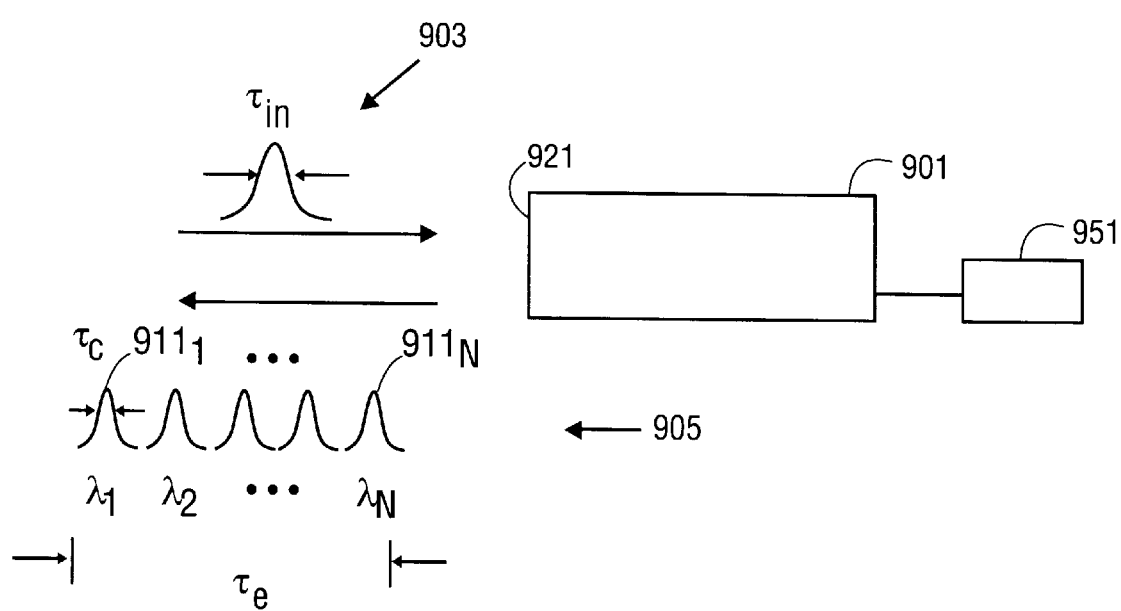
FIG. 9 illustrates operation of a time-wavelength multiple access ("TWMA") coder in which a TWMA coded output of duration $\tau_e$ is produced by spectrally filtering an input pulse of pulse duration $\tau_{in}$ to produce a series of output pulses of pulse duration $\tau_c$ and having respective central wavelengths $\lambda_i$, amplitudes $a_i$, and phases $\phi_i$, wherein $\phi_i$ and $\lambda_i$ are programmably selected by applying voltages to corresponding segments.

FIG. 9 illustrates operation of a time-wavelength multiple access ("TWMA") coder 901. An input pulse 903 of duration $\tau_{in}$ is incident to the coder 901 that spectrally filters the input pulse 903 and produces a TWMA-coded output 905 of total duration $\tau_e$. As shown in FIG. 9, the input pulse 903 enters an input surface 921 of the coder 901 and the TWMA-coded output 905 exits the surface 921 as well. The TWMA-coded output 905 can be used as, for example, a temporal identification code in an optical CDMA system. The TWMA-coded output 905 comprises a series of output pulses $911_i$ ($911_1, \ldots, 911_N$), each pulse having a duration $\tau_c$ and a respective central wavelength $\lambda_i$ ($\lambda_1, \ldots, \lambda_N$), respective amplitude $a_i$ ($a_1, \ldots, a_N$), and respective phase $\phi_i$ ($\phi_1, \ldots, \phi_N$). The respective phases $\phi_i$ and wavelengths $\lambda_i$ are determined by control voltages applied to the coder 901 from a controller 951.

Figure 10:
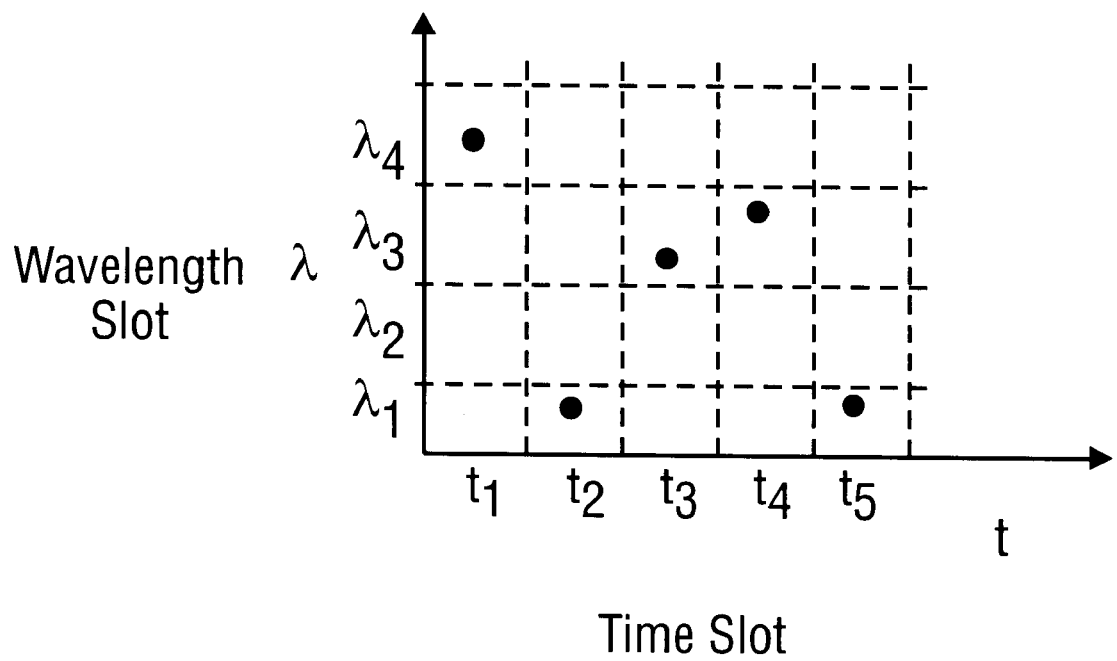
FIG. 10 is a graph representing a TWMA code, illustrating an occupancy of time and wavelength slots specified by the TWMA code.

A TWMA code, as described in U.S. patent application Ser. No. 09/354,851, specifies a coded output as a series of pulses, each pulse having an assigned wavelength (or wavelengths) and occurring in one or more assigned time slots. A graphical depiction of a representative TWMA code is given in FIG. 10. TWMA codes can specify pulses in all available time slots, at all available wavelengths, or can have one or more empty time slots. In addition, TWMA codes can have more than one wavelength component in one or more time slots, and can use the same wavelength in more than one time slot. TWMA codes can be coherent or incoherent codes, wherein a coherent code maintains a specified phase relationship between wavelength components in different time slots.

Figure 11:
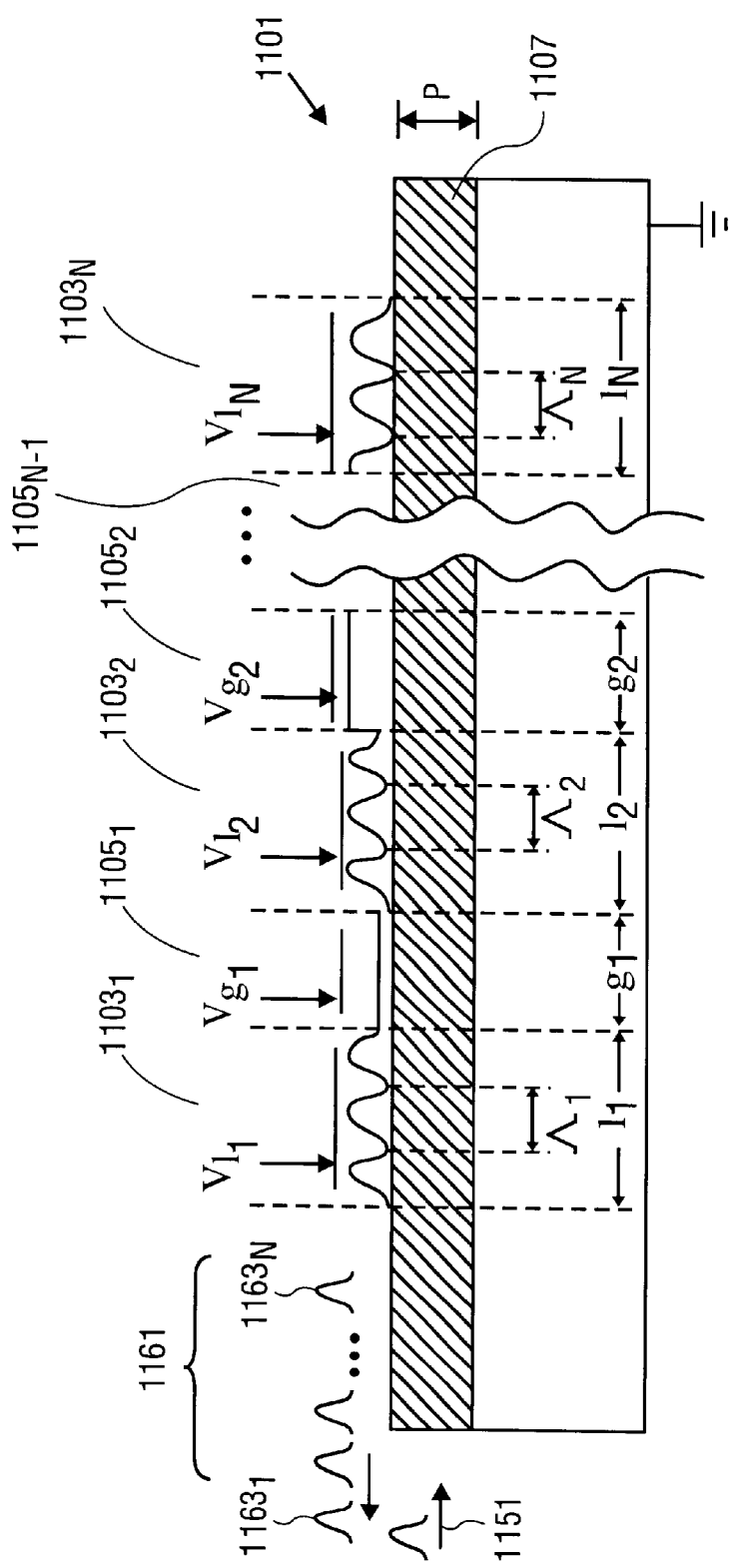
FIG. 11 is a schematic view of a programmable TWMA coder formed on an electro-optic substrate and to which independent voltages can be applied to one or more corrugation or spacer segments. A voltage $V_{l_i}$ applied to a selected corrugation segment tunes a respective grating spacing and a center wavelength $\lambda_i$ of the selected corrugation segment. A voltage $V_{g_i}$ applied to a selected spacer segment tunes a respective phase shift.

With reference to FIG. 11, a TWMA code generator 1101 includes a series of corrugation segments $1103_i$ ($1103_1, \ldots, 1103_N$) and spacer segments $1105_i$ ($1105_1, \ldots, 1105_{N-1}$) formed on a waveguide core 1107. Corrugations of respective corrugation segments $1103_i$ ($1103_1, \ldots, 1103_N$) have respective spatial periods $\Lambda_i$ ($\Lambda_1, \ldots, \Lambda_N$). Independent voltages can be applied to the corrugation and spacer segments. A voltage $V_{l_i}$ applied to a particular corrugation segment $1103_i$ tunes a respective grating period $\Lambda_i$ of the corrugation segment $1103_i$ by the electro-optic effect. This, in turn, tunes a respective central diffraction wavelength $\lambda_i$ of the corrugation segment $1103_i$. A respective voltage $V_{g_i}$ applied to a particular spacer segment $1105_i$ produces a respective variable phase (time) shift that is proportional to $V_{g_i}$. The spatial corrugation periods $\Lambda_1, \ldots, \Lambda_N$ in different corrugation segments $1103_1, \ldots, 1103_N$ can be equal or can be different to span a wider wavelength range than obtainable using electro-optic tuning only.

The coder 1101 receives an input pulse 1151 and produces a TWMA coded output 1161 that comprises a series of output pulses $1163_i$, wherein a first output pulse $1163_1$ is produced by diffraction from the corrugation segment $1103_1$, a second output pulse $1163_2$ is produced by diffraction from the corrugation segment $1103_2$, and so on. Therefore, a Bragg wavelength $\lambda_i$ of the corrugation segment $1103_i$ is tuned to diffract the desired wavelength for the ith output pulse $1163_i$. In coherent TWMA, the spacer segment $1105_1$ between the first and second corrugation segments $1103_1$, $1103_2$ is used to adjust the phase between the first output pulse $1163_1$ and the second output pulse $1163_2$. The remaining spacer segments $1105_i$ are used in a similar manner. As shown in FIG. 11, the coder 1101 produces a coded output, but the coder 1101 also can serve as a decoder, receiving a coded input and producing a decoded output.

Figure 12:
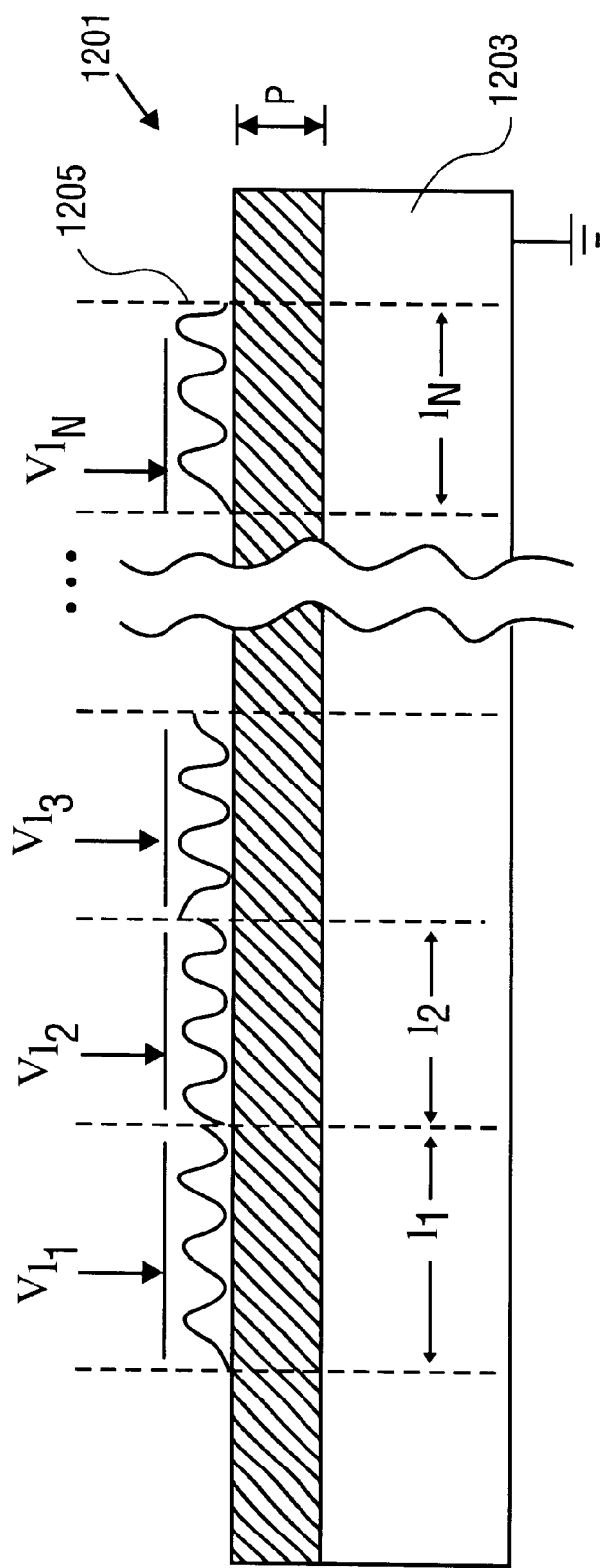
FIG. 12 is a schematic view of a TWMA coder in which a delay is specified for a wavelength $\lambda_i$ by electro-optically tuning a corrugation segment.

With reference to FIG. 12, a waveguide coder 1201 comprises a substrate 1203 and a cladding layer 1205, and includes a plurality of corrugation segments $1209_i$ each having a corresponding length $l_i$. Programmable delays for a selected wavelength $\lambda i$ are obtained by electro-optic tuning of the center wavelengths of those corrugation segments $1209_i$ that produce the selected respective delays for the respective wavelengths $\lambda_i$.

Figure 13:
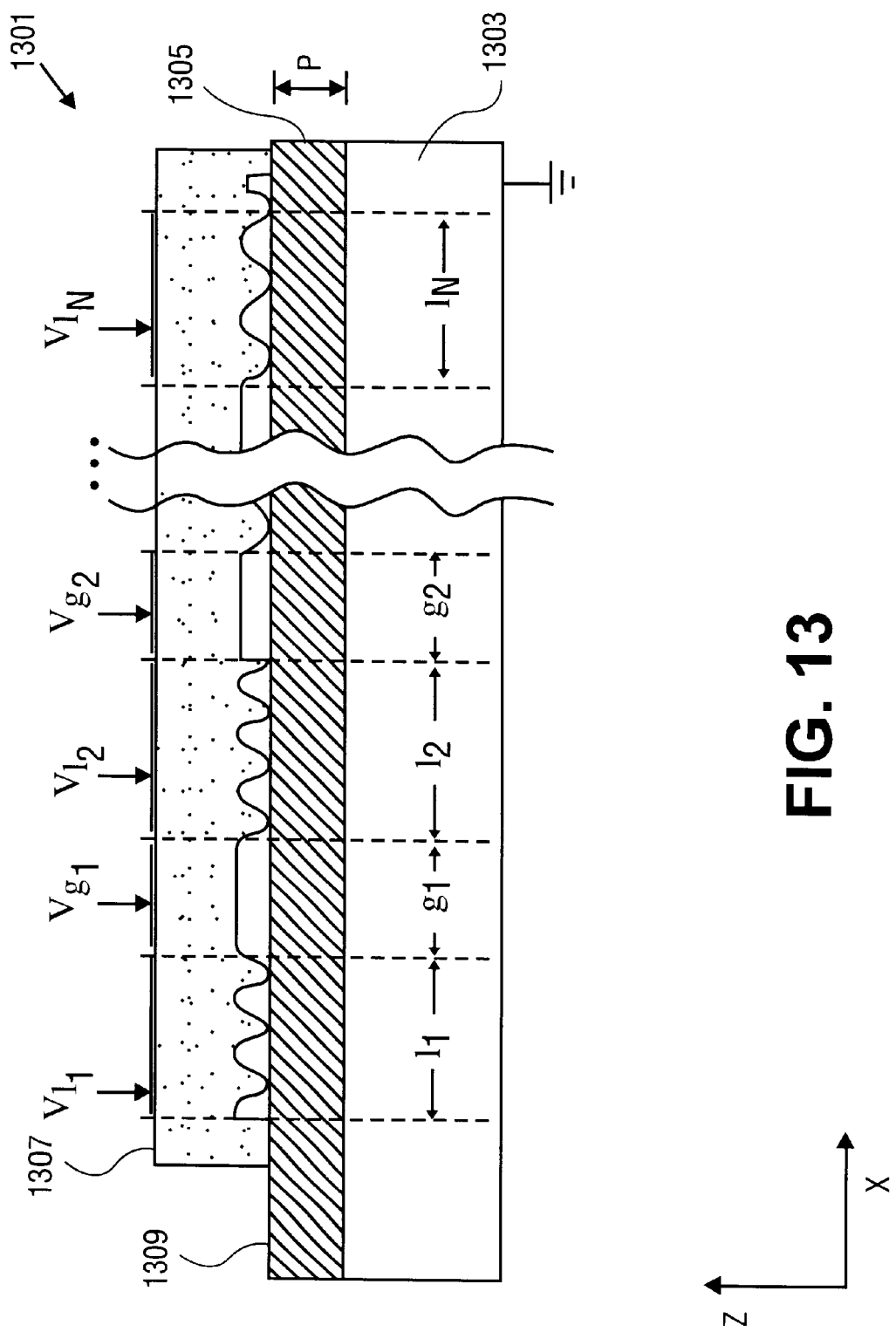
FIG. 13 is a schematic view of a coder that has corrugation segments defined by a corresponding corrugation of a mold.
Figure 14:
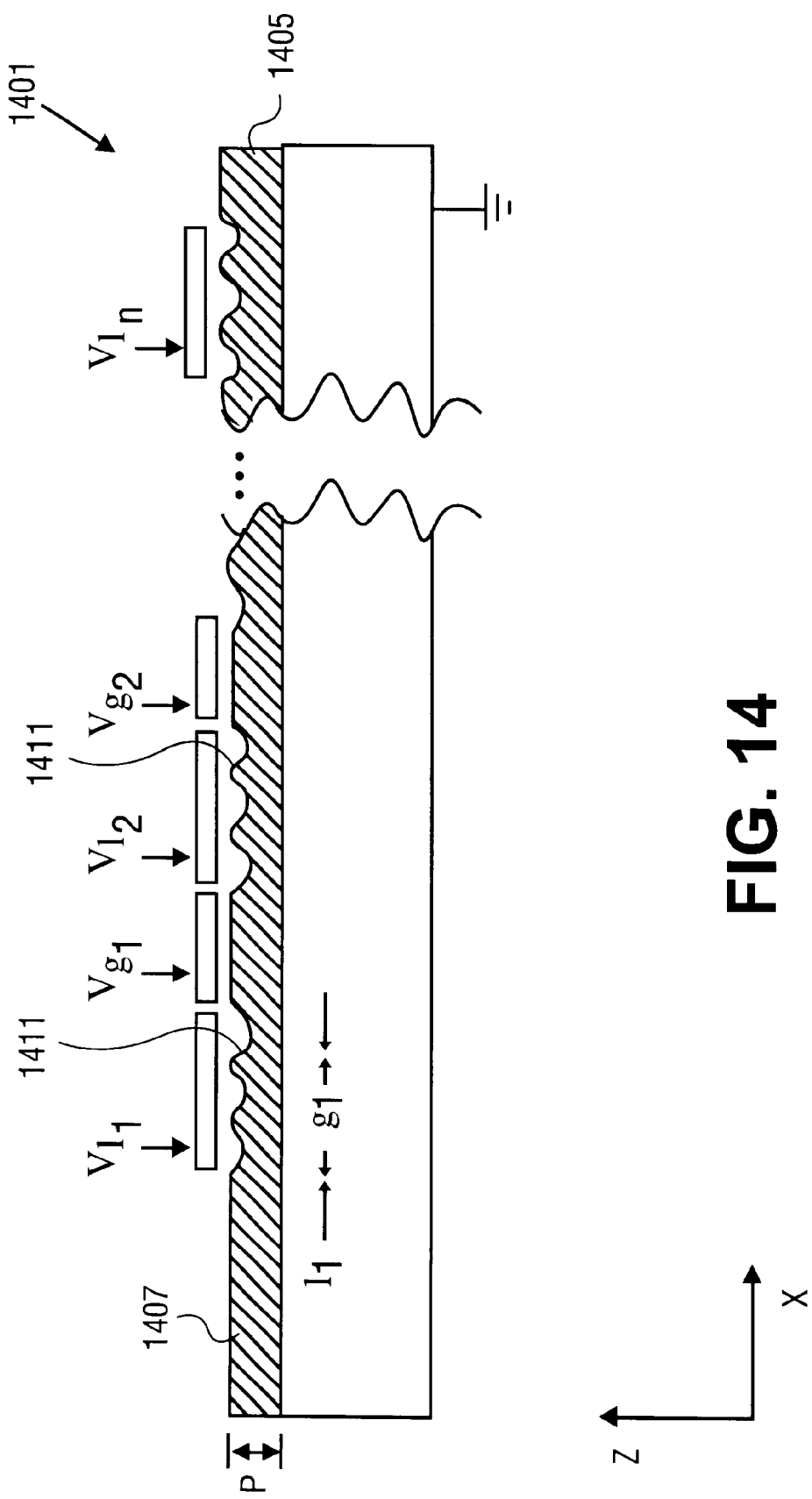
FIG. 14 is a sectional view of a coder in which a surface of a waveguide is physically or chemically processed to form one or more corrugation segments in a waveguide formed in an electro-optic substrate.
Figure 15A:
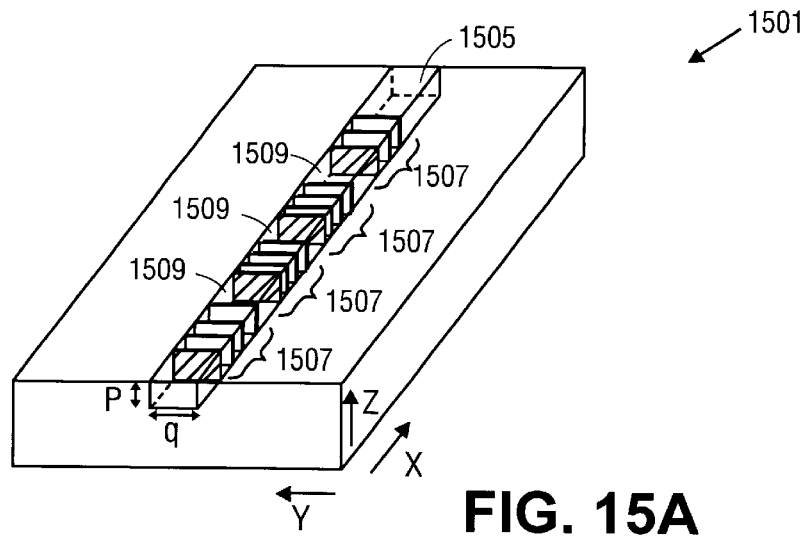
FIGS. 15A–15B are perspective and sectional views, respectively, of a coder having corrugation segments that comprise refractive index modulations in a core of a waveguide. Dark and light segments correspond to waveguide regions having high and low indices of refraction, respectively.
Figure 15B:
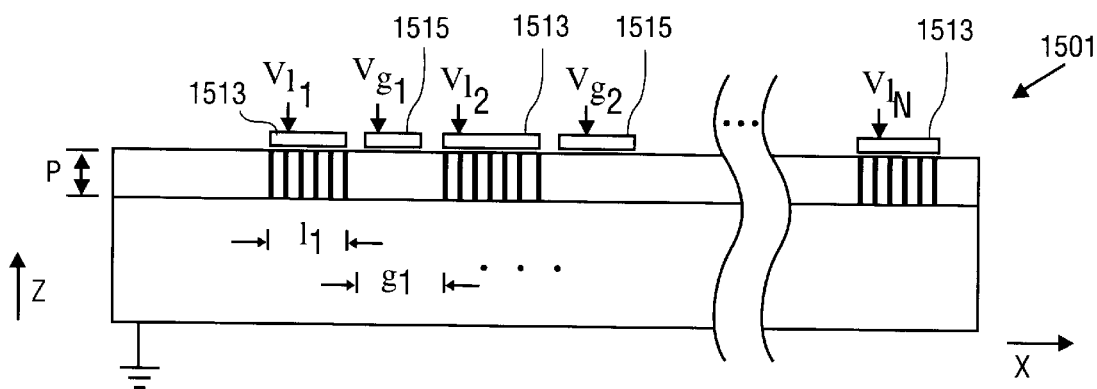

Additional embodiments are illustrated in FIGS. 13, 14, and 15A–15B. With reference to FIG. 13, a waveguide coder 1301 comprises a core 1305 and a substrate 1303. A corrugated substrate 1307 is applied to a surface 1309 of the substrate 1303, and no additional molding steps are necessary. FIG. 14 illustrates a waveguide coder 1401 that includes a core 1405 that is physically or chemically processed to form corrugations 1411 directly on a surface 1407 of the core 1405. Such corrugations can be formed by, for example, reactive ion etching. Referring to FIGS. 15A–15B, a waveguide coder 1501 comprises a core 1505 of dimensions p, q with corrugation segments 1507 having refractive-index modulations in the core 1505. The waveguide coder 1501 also includes spacer segments 1509 and electrodes 1513, 1515 for the corrugation segments and the spacer segments, respectively. Parameters $V_{l_i}$, $l_i$ and $V_{g_i}$, $g_i$ have the same meanings used previously, and refer to a voltage applied to and a length of an ith corrugation segment and a voltage applied to and a length of an ith spacer segment, respectively.

Figure 16:
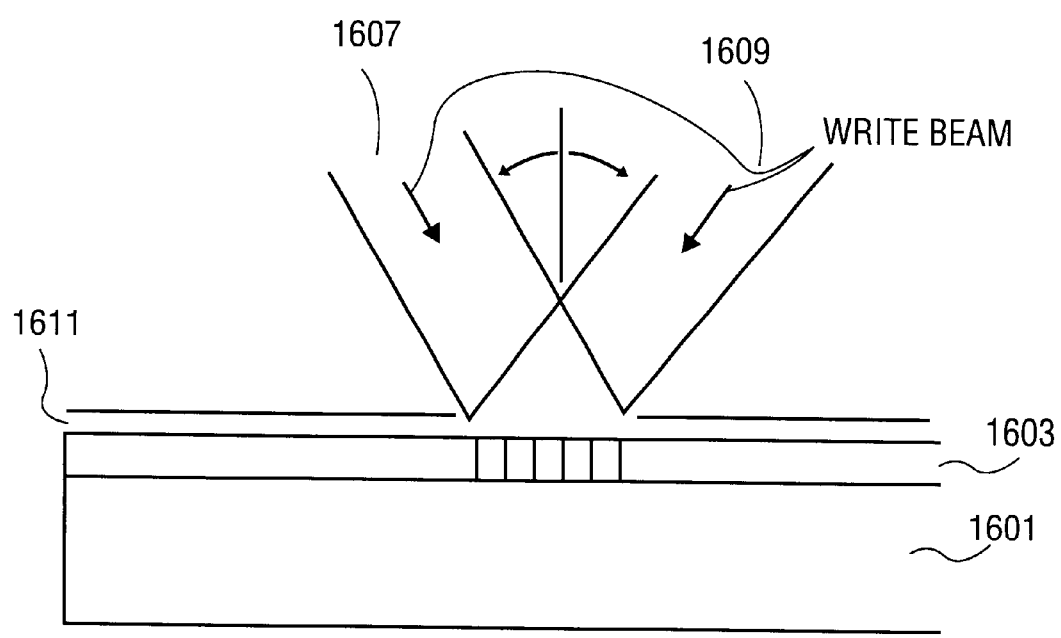
FIG. 16 illustrates a holographic exposure method for producing index-of-refraction modulations in a waveguide core.

With reference to FIG. 16, a holographic exposure method for generating refractive-index modulations in a core of a waveguide includes applying a photoresist layer 1603 to a substrate 1601. The photoresist layer 1603 is exposed with two write beams 1607, 1609 that interfere to produce a spatial periodicity corresponding to a desired spatial period of a refractive-index variation in a core of a waveguide. A mask 1611 prevents the write beams 1607, 1609 from illuminating areas of the substrate 1601 in which gratings of other periods (or no gratings at all) are to be formed. The photoresist layer 1603 is developed, and the spatial modulation in the photoresist layer 1603 is transferred to the core 1603 by a chemical processing technique. Gratings with spatial periods as short as 292 nm can be produced in lithium niobate waveguides using a proton-exchange process to define the gratings. As discussed above, the proton-exchange process (as known in the art) can also be used to define the core 1603.

Figure 17:
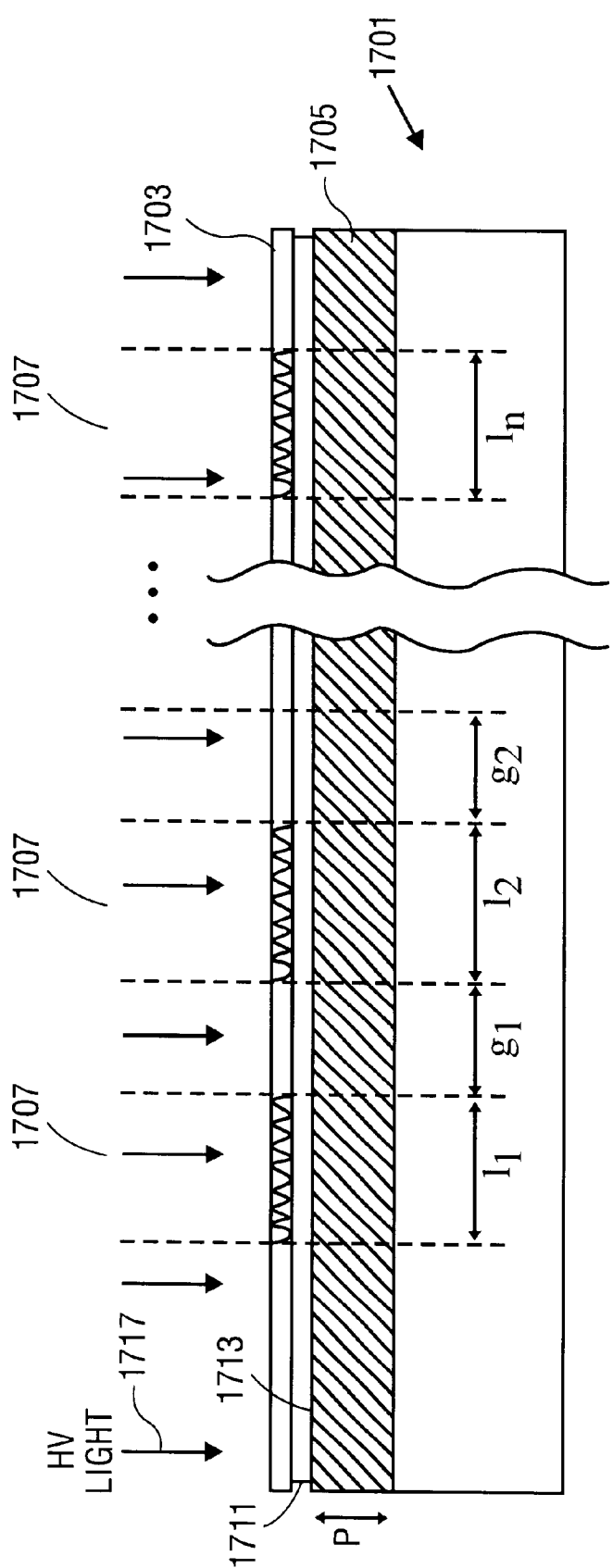
FIG. 17 illustrates a method for producing a coder using a phase mask to produce refractive-index modulations in a waveguide core.

FIG. 17 illustrates an exposure technique using a phase mask 1703 to generate segments 1707 having refractive-index modulations in a core 1705 of a channel waveguide 1701. A photoresist layer 1711 on a surface 1713 of the core 1705 is exposed to a spatial modulation caused by an interference, produced by the phase mask 1703, of a write beam 1717. This spatial modulation is transferred from the exposed photoresist layer 1711 to the core 1705 through chemical processing techniques as described above.

The methods illustrated in FIGS. 16–17 can also be used to write refractive-index gratings in a core of a waveguide through the photo-refractive effect. In this case, the gratings are written by exposing the substrate to radition having a wavelength to which the substrate is photo-refractively sensitive. For lithium niobate, green light can be used.

The code generators, coders, and waveguides described above are described with reference to channel waveguides in a lithium niobate substrate. Alternatively, other electro-optic substrate materials can be used, such as lithium tantalate, potassium niobate, gallium arsenide, ADP, KDP, RTA, and others. In addition to electro-optic substrates, the code generators can be fabricated in any of various other substrates capable of supporting a waveguide. In addition to channel waveguides, fiber waveguides or other waveguide geometries can be used.

Gratings or other corrugations can also be produced in a core or a cladding of a waveguide formed in an isotropic (or non-electro-optic) substrate such as glass. Such gratings are temperature- and strain-tunable. For example, a coder that comprises fiber Bragg gratings can be tuned by local heating or by imposition of local strains to modify the Bragg wavelengths of the grating segments and the phase shifts between the grating segments.

Figure 18:
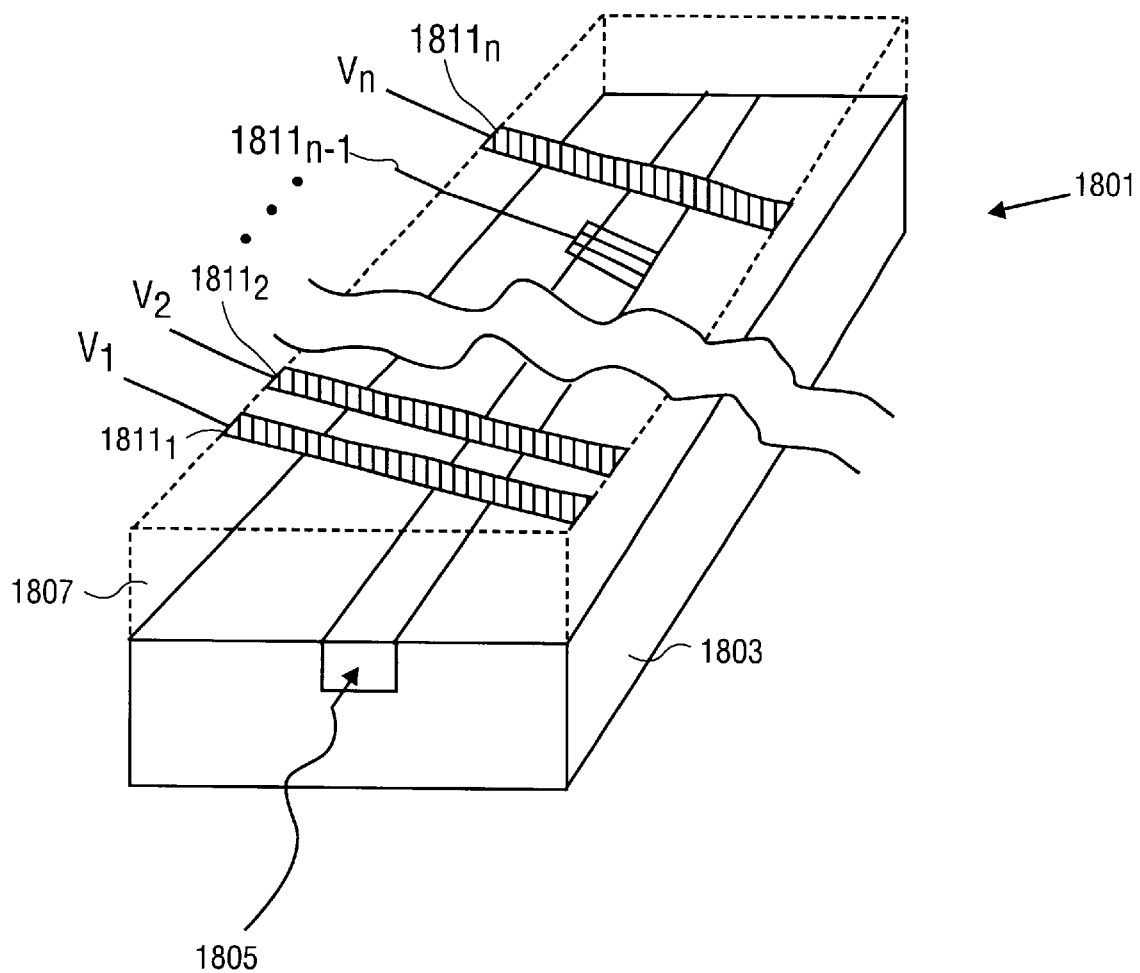
FIG. 18 is a perspective view of a waveguide having a liquid crystal cladding layer.

Gratings also can be formed using a liquid crystal overlay. With reference to FIG. 18, a channel waveguide 1801 includes a core 1805 formed in a substrate 1803. A liquid crystal layer 1807 covers at least a portion of the core 1805 and/or the substrate 1803. Local indices of refraction of the liquid crystal layer are electrically controlled by applying respective voltages $V_i$ to respective electrodes 1811$_i$ to produce a localized reorientation in the liquid crystal layer. Corrugation segments, grating segments, or spacer segments can be defined by the electrodes 1811$_i$. For example, to produce a corrugation region, an electrode to which a voltage $V_i$ is applied can be divided into a periodic array of electrodes such as the electrode 1811$_{n-1}$. Alternatively, corrugation segments and spacer segments can be defined in the core 1805, and the electrodes 1811$_i$ can be used to tune preexisting corrugations.

Additional embodiments include two or more matched or unmatched programmable coders as described above and incorporated into arms of a Mach-Zehnder, Michelson, or other interferometer. Independent tuning of different segments in the coders in each of the arms permits complex modulations to be achieved, including amplitude modulations that are not achievable with a single coder. In further embodiments, coders comprise corrugation segments having several corrugation periods, i.e., that are "multiply periodic" gratings (gratings having multiple periods). Such segments can diffract multiple wavelengths, thereby enabling the coding and decoding of complex codes. In addition, the respective lengths of the corrugation segments and of the spacer segments can be different from one another.

Figure 19:
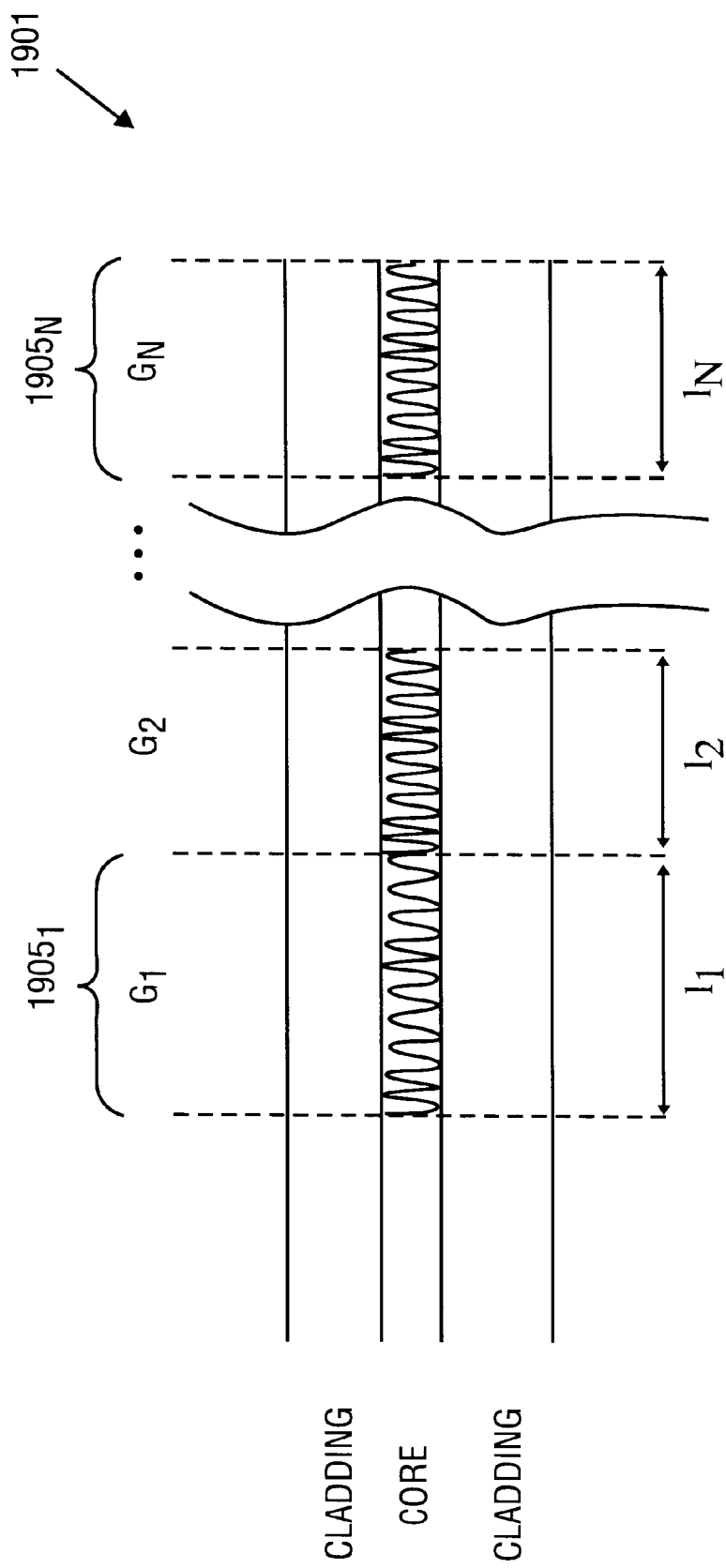
FIG. 19 is a sectional view of a corrugated waveguide having several corrugation segments that have corresponding corrugation periods, wherein the corrugated waveguide is electro-optically, thermally, mechanically, or otherwise tunable.

In yet another variation, the corrugation segments have multiple corrugation periods, and a difference in center wavelengths diffracted by different corrugation segments is larger than a bandwidth of the incident radiation. With reference to FIG. 19, by tuning a waveguide 1901 through mechanical, electro-optic, thermal, or other means, a different code can be coded. For example, a coder can comprise n controllable corrugation segments, each corrugation segment having a refractive-index modulation characterized by two periods, a first period and a second period, that are not necessarily equal for all corrugation segments. If a first control voltage is applied, then incident radiation is diffracted from the first period of each corrugation segment, producing a first coded output. If a second control voltage is applied, then incident radiation is diffracted from the second period of each corrugation segment, producing a second coded output. In general, this approach can be used to generate N codes, each code corresponding to a particular control voltage. The structure of a kth grating segment can be written as a superposition of periodic corrugations:

$$G_k = \sum_{i=1}^{N} \Lambda_{ik} \exp[i\phi_{ik}]$$

where $\phi_{ik}$ is the phase shift of the ith corrugation on the kth corrugation segment, and $\Lambda_{ik}$ is the wavelength of the ith corrugation on the kth corrugation segment.

In an alternate embodiment, different codes are encoded in spatially distinct segments of a waveguide. In this case, only those segments that are resonant with incident radiation diffract the incident radiation to produce a coded output. Thermal, mechanical, or electro-optic tuning can be used to select among codes multiplexed in this manner.

While the principles of the invention have been described with reference to example embodiments, it will be appreciated by those skilled in the art that these example can be modified without departing from the spirit and scope of these principles. The example embodiments are not to be taken as limiting the scope of the invention, and we claim all that is encompassed by the appended claims.

What is claimed is:

1. A programmable optical coder, comprising a waveguide having a core and a cladding, the waveguide including a corrugation segment and a spacer segment, wherein at least one of the corrugation segment and the spacer segment are tunable.

2. The programmable coder of claim 1, wherein the corrugation segment is defined in an electro-optic material.

3. The programmable coder of claim 1, wherein the spacer segment is defined in an electro-optic material.

4. The programmable coder of claim 1, wherein the waveguide includes one or more electrodes corresponding to the corrugation segment and the spacer segment.

5. The programmable coder of claim 1, wherein the spacer segment is configured to apply a phase modulation to electromagnetic radiation received by the programmable coder.

6. The programmable coder of claim 1, wherein the corrugation segment is configured to tune a center wavelength of the corrugation segment.

7. The programmable coder of claim 1, wherein the waveguide comprises a cladding layer and the corrugation segment is defined by a corrugation in the cladding layer.

8. The programmable coder of claim 7, wherein the cladding layer is formed of a linear electro-optic material.

9. The programmable coder of claim 1, wherein the corrugation layer and the spacer layer are configurable to encode or decode a time-wavelength code of electromagnetic radiation received by the programmable coder.

10. A waveguide coder, comprising:
   a waveguide core;
   a cladding layer;
   a spacer segment formed in the waveguide core or in the cladding layer, the spacer segment being tunable to produce a phase modulation of electromagnetic radiation received by the waveguide coder; and
   a corrugation segment formed in the waveguide core or the cladding layer, the corrugation segment being tunable to vary a Bragg wavelength.

11. The waveguide coder of claim 10, wherein the waveguide core is formed in an electro-optic material.

12. The waveguide coder of claim 11, wherein the cladding layer is formed of an electro-optic material.

13. The waveguide coder of claim 10, wherein the waveguide is formed in an electro-optic substrate.

14. A programmable time-wavelength coder that receives an input optical signal having a first time-wavelength spectrum and generates an output signal having a second time-wavelength spectrum, each of the first and second time-wavelength spectra including a plurality of spectral components, the coder comprising a waveguide that includes a plurality of gratings defined by respective spatial variations of an optical property of the waveguide, wherein at least one of the spatial variations is programmable.

15. The programmable time-wavelength coder of claim 14, wherein the programmable spatial variation provides a programmable Bragg wavelength.

16. The programmable time-wavelength coder of claim 14, wherein the waveguide includes a spacer segment configured to provide a phase modulation of electromagnetic radiation received by the coder that is programmable to within about one-half of a wavelength of an associated spectral component of the electromagnetic radiation.

17. A method of applying a code to an optical signal, the method comprising:

providing a waveguide that includes a tunable corrugation segment and a tunable spacer segment;

providing an electrode for the tunable corrugation segment and an electrode for the tunable spacer segment;

applying a first voltage to the electrode associated with the tunable corrugation segment and a second voltage to the electrode associated with the tunable spacer segment, wherein the first voltage and the second voltage are selected to apply the code to the optical signal.

18. The method of claim 17, further comprising providing an electro-optic substrate for the waveguide.

19. The method of claim 17, wherein applying the first voltage changes center wavelength of a Bragg grating and applying the second voltage changes a phase of the optical signal.

* * * * *